Feb. 4, 1969   R. G. SMITH   3,425,451

VARIABLE-FLOW PLUG AND VALVE

Filed Feb. 23, 1966

INVENTOR.
RUSSELL G. SMITH
BY
J. Warren Kinney Jr.
ATTORNEY

United States Patent Office 3,425,451
Patented Feb. 4, 1969

3,425,451
VARIABLE-FLOW PLUG AND VALVE
Russell G. Smith, Cincinnati, Ohio, assignor to Continental Manufacturing Company, Cincinnati, Ohio, a corporation of Ohio
Filed Feb. 23, 1966, Ser. No. 529,393
U.S. Cl. 137—637.4
Int. Cl. F16k 5/10, 5/06
8 Claims

ABSTRACT OF THE DISCLOSURE

The valve disclosed comprises a tapered valve plug rotatable in a tapered chamber, with a solid stem extending axially from the larger end of the plug. The plug includes a smaller end having an end wall axially bored and internally screw-threaded to support a rotationally adjustable flow interceptor, which may be manipulated for adjustment by means of a tool insertible through a bottom opening in the valve body. Said opening of the valve body is normally closed by means of a threaded plug independent of the valve plug and the interceptor. Said interceptor is removable and replaceable, as well as adjustable, through the opening in the bottom of the valve body.

---

The present invention relates to a variable-flow valve.

An object of the invention is to provide a valve of the plug type, which includes means incorporated in the plug member and readily accessible at all times, to regulate a flow of fluid through the valve.

Another object of the invention is to provide a variable-flow valve of the character stated, which may be economically manufactured and easily adjusted and serviced.

A further object is to provide a valve having the aforementioned characteristics, and which is so constructed as to preclude leakage of fluid from a system controlled by the valve.

Another object of the invention is to provide a variable-flow plug valve with a simple and effective regulating means so constructed as to require no servicing or replacement throughout the useful life of the valve.

The foregoing and other objects are attained by the means described herein and illustrated upon the accompanying drawing, in which.

Figure 1:
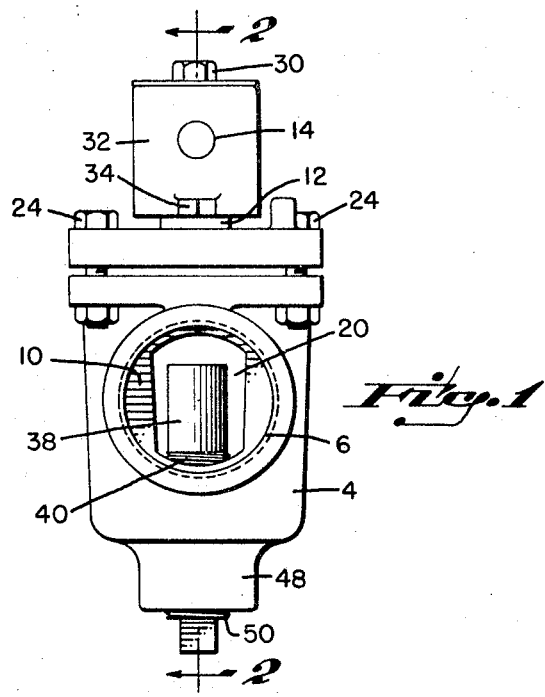
FIG. 1 is a side elevation of the improved valve, with the plug member rotated to open position.

The improved valve comprises a body 4, usually of metal, incorporating an inlet port 6 and an outlet port 8 threaded or otherwise adapted for connection to pipes of a fluid transfer system. The body may be bored or reamed transversely of the ports, and preferably with a tapered bore, to receive therein a correspondingly tapered plug member 10 having a stem 12 whereby the plug member may be rotated by means of a tool or handle 14, or other suitable actuator. The tapered bore 16 of the valve body may be fitted with suitable bearing means 18 against which the plug may seat to prevent fluid leakage from the valve chamber, such bearing means preferably consisting of a liner, sleeve, or perhaps a set of rings, formed of a suitable gasket material of which Teflon is an example. Plug 10 may be transversely apertured as at 20, to provide fluid communication between ports 6 and 8 in the open condition of the valve as shown. As is usual, a quarter-turn of the plug closes the valve.

A bonnet 22 removably secured to the valve body by means of bolts or screws 24, surrounds plug stem 12 and incorporates suitable sealing means 26 precluding leakage of fluid past the stem. The sealing means may be conventional of design, and may include pressure adjusting screws 28 to maintain the stem seal. If desired, the upper end of stem 12 may be axially bored and tapped to receive a screw 30, for securing a cap 32 upon the stem. The cap may carry a lug 34 to indicate the open or closed positions of the valve plug, or to limit rotation of the plug between an open and a closed position.

In accordance with the present invention, the innermost or reduced end of plug 10 is provided with an interiorly threaded bottom bore 36, into which is threaded a flow interceptor 38. The flow interceptor may consist of a cylindrical elongate rod having a screw-threaded end 40 and an adjacent end socket 42, the socket being receptive of a wrench or tool for rotating the part 38. As will readily be understood, the flow interceptor when rotated in one direction, may be caused to advance and to occupy a considerable area of the valve plug port 20, thereby to restrict flow of fluid between the valve body ports 6 and 8 when the valve is in fully open position. On the other hand, the flow interceptor may be withdrawn from plug port 20 by rotating the interceptor in the opposite direction, thereby to permit substantially unrestricted flow of fluid through the valve. The latter position of the flow interceptor is indicated by broken lines 44 upon FIG. 2.

Figure 2:
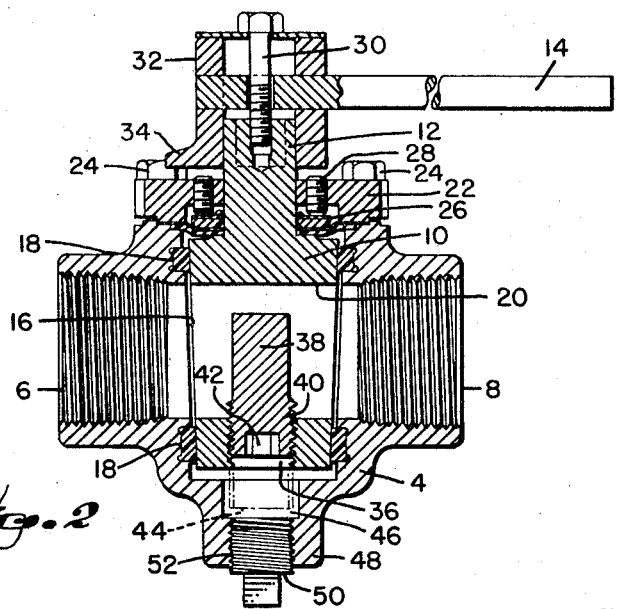
FIG. 2 is a cross-section taken on line 2—2 of FIG. 1.

It will be noted by referring to FIG. 2, that valve body 4 is provided with a well 46 beneath the flow interceptor 38. The flow interceptor when withdrawn from plug port 20, may project into the well as indicated by broken lines 44. So withdrawn, the flow interceptor affords little, if any, interference with flow of fluid through the valve.

Beneath the well 46 may be formed a boss 48 drilled and tapped concentrically with socket 42, for normally accommodating a closure plug 50, the latter to be removed whenever a tool is to be inserted through the tapped opening 52 of the boss for effecting rotational adjustment of flow interceptor 38. The adjustment ordinarily may be made while the valve is in closed position, but may be made even though the valve is open, assuming a leak-proof condition of the seals at 18.

The threaded connection between the flow interceptor and the bottom portion of the valve plug, should preferably be tightly fitted in order to preclude accidental rotation of the flow interceptor while the valve is in use. A tight leak-proof fitting of closure plug 50 is of course desirable also.

The mass of the flow interceptor 38 which is projectable into the plug port 20, should be of lesser diameter than plug bore 36, in order to permit withdrawal of the interceptor through bore 36 and into well 46. The interceptor may be of any desired diameter, within the limits of the plug bottom diametral dimension; and means other than that which is specifically illustrated herein may be provided for adjusting the interceptor axially of the plug stem. Moreover, the present invention is applicable to valves in which the plug member is right cylindrical rather than tapered.

It is to be understood that various modifications and changes may be made in the structural details of the device, within the scope of the appended claims, without departing from the spirit of the invention.

What is claimed is:
1. A variable-flow fluid control valve comprising in combination: a valve body having inlet and outlet ports, and a tapered intermediate chamber; a tapered valve plug rotatably fitted in said chamber, said plug having at the larger end thereof an actuating stem, an axially bored and threaded bottom wall at the smaller end of said plug, and a transverse port intermediate said stem and said wall for placing the inlet port in fluid communication with the outlet port upon partial rotation of the valve plug; and a flow interceptor in the form of an elongate rod threaded into said axial bottom bore and means operable through an opening in the bottom of the valve body for selectively moving said rod into and out of the valve plug port various distances, for varying the effective size of said plug port and its capacity to pass fluid from the inlet port of the valve body to the outlet port thereof.

2. The valve as specified by claim 1, wherein the flow interceptor is mounted solely upon the valve plug, and is accessible for selective shiftability through said opening provided in the valve body intermediate the inlet and outlet ports thereof.

3. The valve as specified by claim 2, wherein the access opening in the valve body is aligned with the axis of the plug stem, and said opening is internally screw-threaded to threadedly accommodate a removable closure plug.

4. The valve as specified by claim 2, wherein a well is provided in the valve body between the access opening and the bottom wall of the plug, to accommodate one end of the interceptor rod as the rod is withdrawn from the plug port.

5. The valve as specified by claim 1, wherein the flow interceptor is an elongate rod having at one end a portion engageable by a turning tool, and at the same end an external screw thread; an internally threaded bore in the valve plug bottom wall, and in which is threaded the screw threaded end of the elongate rod, whereby rotation of the rod results in longitudinal shifting thereof for disposing the opposite end of the rod to various degrees of extension into the valve plug port for variously impeding flow of fluid therethrough; an access opening in the valve body aligned with the axis of the plug stem and with the portion of the elongate rod which is engageable by a turning tool, whereby a turning tool may be inserted in the access opening to engage the rod and rotate same for the purposes stated; and a well in the valve body intermediate the access opening and the bottom wall of the plug, to receive freely the threaded end of the rod displaced from the plug bottom bore incident to withdrawal of the rod relative to the valve plug port.

6. The valve as specified by claim 5, wherein are aligned the axes of the stem, the rod and tool engaging portion thereof, the well, and the access opening; and wherein the portion of the rod opposite the threaded end thereof is smaller in diameter than the threaded bore in the valve plug bottom wall.

7. A variable-flow fluid control valve comprising in combination: a valve body having inlet and outlet ports, and an intermediate tapered chamber; a tapered valve plug rotatable in said chamber, said plug having an axial solid actuating stem at the larger end thereof, a bottom wall axially bored through at the smaller end of said plug and including screw threads in said through bore, and a transverse port in the plug intermediate said stem and said wall, said plug port being registrable with said inlet and outlet body ports upon partial rotation of the plug; a flow-intercepting rod having an externally threaded mounting end engaging the threads of said bottom wall bore, and an opposite end of smaller diameter than said threaded end, said opposite end being disposed within the valve plug port; a bottom boss on the valve body having an end bore adjacent to and aligned with the internally threaded bore of the plug bottom wall, said end bore providing a passageway through which the flow-intercepting rod is bodily displaceable when unscrewed from the threaded bore of the bottom wall of the plug; means on the threaded end of the flow-intercepting rod to engage a turning tool insertable through said boss bore to rotate and axially adjust the flow-intercepting rod and unscrew the same for detachment thereof from said plug bore and bodily displacement thereof through the end bore of said boss; detachable closure means independent of the valve plug and said rod, for normally closing said boss bore; and adjustable packing means surrounding the actuating stem of the valve plug.

8. A variable-flow fluid control valve comprising in combination: a valve body having inlet and outlet ports, and an intermediate tapered chamber; a tapered valve plug rotatable in said chamber, said plug having an axial solid actuating stem at the larger end thereof, a bottom wall axially bored through at the smaller end of said plug and including screw threads in said through bore, and a transverse port in the plug intermediate said stem and said wall, said plug port being registrable with said inlet and outlet body ports upon partial rotation of the plug; a flow-intercepting rod of predetermined length having an externally threaded mounting end engaging the threads of said bottom wall bore, and an opposite end of smaller diameter than said threaded end, said opposite end being disposed within the valve plug port; a bottom boss on the valve body having an end bore aligned with the internally threaded bore of the plug bottom wall, said end bore providing a passageway through which the flow-intercepting rod is bodily displaceable when unscrewed from the threaded bore of the bottom wall of the plug, said bottom boss having a pocket disposed between said threaded end bore and said bottom wall of said plug, said pocket having a depth at least equal to substantially one third the length of said flow-intercepting rod to provide a space for axially adjusting said rod; means on the threaded end of the flow-intercepting rod to engage a turning tool insertable through said boss bore to rotate and axially adjust the flow-intercepting rod and unscrew the same for detachment thereof from said plug bore and bodily displacement thereof through the end bore of said boss, detachable closure means independent of the valve plug and said rod for normally closing said boss bore, and adjustable packing means surrounding the actuating stem of the valve plug.

References Cited

UNITED STATES PATENTS

| 2,095,372 | 10/1937 | Slavin | 251—121 |
| 2,926,884 | 3/1960 | Clinkenbeard | 251—309 X |
| 3,128,987 | 4/1964 | O'Connor | 251—312 |

FOREIGN PATENTS

| 15,914 | 6/1906 | Great Britain. |
| 83,672 | 12/1956 | Netherlands. |
| 147,893 | 8/1952 | Australia. |

CLARENCE R. GORDON, Primary Examiner.

U.S. Cl. X.R.

137—637.5; 251—121, 309, 317